May 19, 1970  E. J. DELOBELLE  3,512,568
BREAKER STRIP FOR PNEUMATIC TIRES
Filed Oct. 26, 1967
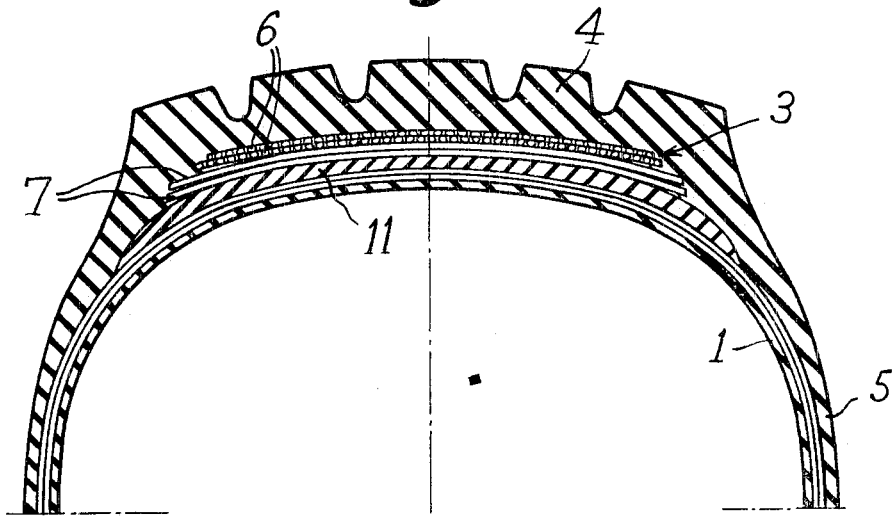
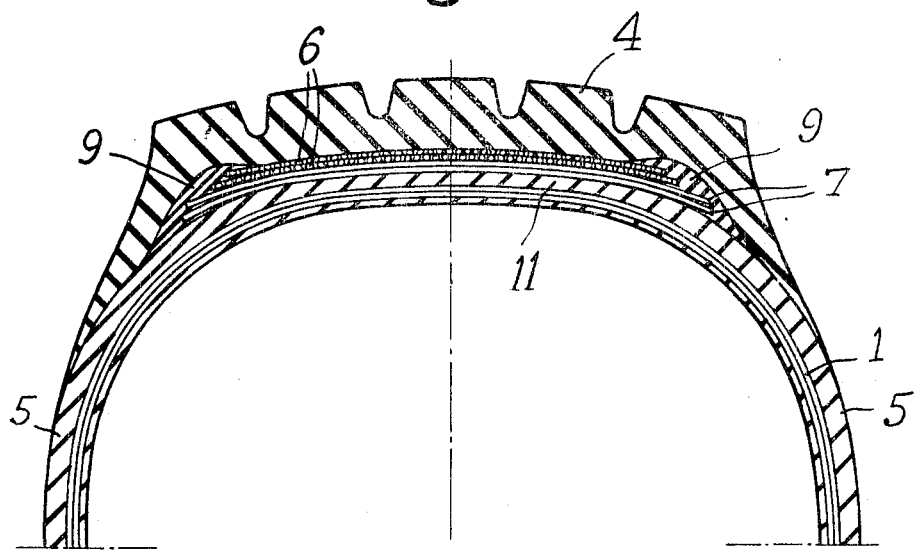

United States Patent Office
3,512,568
Patented May 19, 1970

3,512,568
BREAKER STRIP FOR PNEUMATIC TIRES
Emile Jean Delobelle, Colombes, France, assignor to Pneumatiques Caoutchouc Manufacture et Plastiques Kleber-Colombes, Colombes, France, a French body corporate
Filed Oct. 26, 1967, Ser. No. 678,381
Int. Cl. B60c 9/18
U.S. Cl. 152—361        2 Claims

ABSTRACT OF THE DISCLOSURE

This invention relates to pneumatic tires of the kind that comprises a carcass with supple side walls and a breaker layer reinforcement that is constituted by superimposed layers of cables or wires having a substantially longitudinal direction and a highly rigid layer which is formed of at least two superimposed layers of cables or wires having substantially the same general transverse direction with respect to the equatorial plane of the tire. According to the invention a cushion of rubbery mixture is interposed between the breaker layer and the reinforcement to separate them and render them more independent in their respective functions. This cushion may be made of a mixture of average hardness or it may be in cellular form: alternatively, the mixture may be loaded with fibres.

---

The present invention relates to pneumatic tires having supple flanks or side walls and breaker layer reinforcement, constituted by superimposed layers of cables or wires having a substantially longitudinal direction and a highly rigid layer which is formed of at least two superimposed layers of cables or wires having substantially the same general transverse direction with respect to the equatorial plane of the tire.

In use, tires provided with a breaker layer reinforcement of this type present a much better resistance to the reinforcement becoming unstuck at the edge.

In such constructions, the reinforcing layers may be constituted by slightly inclined cables or wires, preferably placed above the layers of transverse cables, and which are narrower than these latter and their edge are stepped.

The present invention has for an object further to improve a construction of this kind and according thereto, between the carcass of the tire and the breaker layer reinforcement, there is interposed a cushion of rubbery mixture to separate the carcass from the breaker layer reinforcement and to render them more independent in their respective functions.

It has already been proposed to place beneath a breaker layer reinforcement constituted only of layers of slightly inclined cables, a layer of very hard rubbery mixture in an attempt to oppose the relative angular movements of the cables of the layers of the reinforcement. It has also been proposed to place beneath a breaker layer reinforcement of the same type a layer of fairly soft rubbery mixture in order to attempt to prevent the vibrations of the breaker layer reinforcement from being transmitted to the carcass of the tire and to the vehicle itself.

However, the interposition of the cushion according to the present invention does not seek to attain the two objects just mentioned, because the first has already been ensured by the layers of transverse cables of the reinforcement itself, and because, for the second, it seems that it cannot be satisfactorily achieved with a simple layer of soft mixture which rapidly deteriorates in the tire in use. In fact, it has appeared that, contrary to what has been proposed previously, the cushion according to the invention must preferably be made of a rubbery mixture of average hardness so that it presents a sufficient resistance to the stresses exerted at this spot in the tire in use without it too rigidly connecting the reinforcement in the carcass. The reinforcement is, therefore, to some extent, elastically suspended with respect to the carcass. It is under these conditions that the behaviour of the whole tire is improved in particular, a better resistance is given to the unsticking between the edges of the layers of the breaker layer reinforcement and the surrounding rubbery mixture, as well as a more regular wear of the tread.

In order that the invention may be more clearly understood, reference will now be made to the accompanying drawings, the two figures of which respectively show cross-sections through two embodiments thereof.

Referring now to the drawings, the tires shown therein comprise, as usual, a carcass 1 engaged around the metal wires of the beads (not shown), a breaker layer reinforcement 3, a tread 4 and flanks or side walls 5. The tread has any desired pattern, e.g. a conventional pattern of zig-zag grooves.

The carcass 1 is constituted, according to the dimensions of the tire, of one or more layers of "cord" fabric, each composed of textile or metal wires or cables oriented along meridian planes in order to produce a tire having supple flanks or side walls.

The breaker layer reinforcement 3 itself comprises a pair of layers of textile or metal "cord" fabric 6, the wires or cables forming these layers 6 being oriented symmetrically at a small angle with respect to the equatorial plane of the tire, i.e. at an angle which is generally smaller than 20° and preferably comprised between 6 and 15° in the finished tire. The two layers 6 have different widths so that their edges are stepped, i.e. mutually displaced. The breaker layer 3 comprises in addition a very rigid layer constituted in the examples shown of at least two layers 7 formed from wires or cables oriented substantially transversely, i.e. forming with the equatorial plane an angle of the order of 60 to 90°. These two layers 7 are placed directly on one another so that their cables are separated only by the very thin layer of rubber with which the layers of cables are generally coated. These two layers are slightly larger than the layers 6 as shown in the drawings.

The tire shown in FIG. 1 comprises a cushion 11 composed of rubbery mixture interposed between the breaker layer of the carcass 1 and the reinforcing layers 7. The width of this cushion 11 is at least equal to that of the layers 7 and preferably slightly larger. The finished tire may have a constant thickness from one edge to the other or it may be slightly thicker on the sides than at the center in order to compensate for the difference of the radii of the transverse curves of the carcass and the breaker layer. By way of indication, the thickness at the center of this cushion may be of the order of 3 to 6 mm. or even more in the case of very large tires such as tires in the extra-heavy category. In certain cases, for example when there is a great difference between the radii of the transverse curve of the reinforcement and that of the carcass, the thickness of the cushion may be nil at the center of the tire, the cushion then being interrupted at the center and constituted practically of two separate elements interposed between the lateral parts of the reinforcement and the carcass and whose thickness increases towards the edges of the reinforcement.

As indicated above, this cushion 11 is made of a rubbery mixture of average hardness, viz a hardness of the order of 50 to 65 Shore A, this generally being lower than the hardness of the mixture constituting the tread 4 and of the same magnitude as the hardness of the mixture usually used for the flanks or side walls 5.

By way of modification, one may, moreover, use for this cushion 11 the same rubbery mixture as that used for the flanks 5, these latter then extending until they adjoin one another again between the breaker layer of the carcass 1 and the breaker layer 3 (FIG. 2), or at least until they become interposed between the lateral parts of the reinforcement and the carcass.

However, the rubbery mixture used for the cushion 1 may be different from that of the other mixtures used in the tire. For example, a rubbery mixture which is cellular and/or loaded with fibres in order to give it the desired degree of hardness may be used.

Of course, other characteristics known per se may also be used in these tires, such as for example the addition of a sub-tread in one or two parts 9 (FIG. 2).

I claim:

1. In a tire of the kind comprising a carcass with supple side walls and a breaker structure constituted by at least one pair of superimposed layers of cables or wires having substantially longitudinal directions, forming small angles not exceeding 20° with respect to the equatorial plane of the tire, the cables or wires of one said layer extending in a direction crossing the direction of the cables or wires in the other said layer, and by a highly rigid layer which is formed by at least two superimposed layers of parallel cables or wires which have substantially the same general transverse direction, forming an angle of 60 to 90° with respect to the equatorial plane of the tire, said highly rigid layer being positioned between the remaining layers of said breaker structure and said carcass, the improvement which consists of a rubber cushion interposed between said breaker structure and said carcass to separate them and to render them more independent in their respective functions.

2. A tire according to claim 1, wherein said cushion is constituted by an extension of the flanks between said carcass and said reinforcement.

References Cited

UNITED STATES PATENTS

| | | | |
|---|---|---|---|
| 2,225,042 | 12/1940 | Elliott | 152—361 |
| 2,493,614 | 1/1950 | Bourdon | 152—361 |
| 2,786,507 | 3/1957 | Howe et al. | 152—360 |
| 2,930,426 | 3/1960 | Klank et al. | 152—361 |
| 3,081,811 | 3/1963 | Beckadolph et al. | 152—361 |
| 3,095,026 | 6/1963 | Weber | 152—361 |
| 3,224,481 | 12/1965 | Lugli | 152—361 |

FOREIGN PATENTS 1,389,428 2/1965 France.

ARTHUR L. LA POINT, Primary Examiner

C. B. LYON, Assistant Examiner